(12) United States Patent
Hadidi et al.

(10) Patent No.: US 9,023,259 B2
(45) Date of Patent: May 5, 2015

(54) METHOD FOR THE DENSIFICATION AND SPHEROIDIZATION OF SOLID AND SOLUTION PRECURSOR DROPLETS OF MATERIALS USING MICROWAVE GENERATED PLASMA PROCESSING

(71) Applicant: Amastan LLC, Storrs, CT (US)

(72) Inventors: Kamal Hadidi, Somerville, MA (US); Makhlouf Redjdal, Storrs-Mansfield, CT (US)

(73) Assignee: Amastan Technologies LLC, North Andover, MA (US)

( * ) Notice: Subject to any disclaimer, the term of this patent is extended or adjusted under 35 U.S.C. 154(b) by 175 days.

(21) Appl. No.: 13/675,541

(22) Filed: Nov. 13, 2012

(65) Prior Publication Data

US 2014/0131906 A1 May 15, 2014

(51) Int. Cl.
*B29B 9/16* (2006.01)
*H05H 1/30* (2006.01)

(52) U.S. Cl.
CPC ... *B29B 9/16* (2013.01); *H05H 1/30* (2013.01)

(58) Field of Classification Search
None
See application file for complete search history.

(56) References Cited

U.S. PATENT DOCUMENTS

| | | | |
|---|---|---|---|
| 4,076,640 A | 2/1978 | Forgensi et al. | |
| 5,958,361 A | 9/1999 | Laine et al. | |
| 5,989,648 A | 11/1999 | Phillips | |
| 6,261,484 B1 * | 7/2001 | Phillips et al. | 264/5 |
| 6,274,110 B1 | 8/2001 | Kim et al. | |
| 6,543,380 B1 | 4/2003 | Sung-Spitzl | |
| 6,569,397 B1 * | 5/2003 | Yadav et al. | 423/345 |
| 6,652,822 B2 | 11/2003 | Phillips et al. | |
| 6,902,745 B2 | 6/2005 | Lee et al. | |
| 6,919,527 B2 | 7/2005 | Boulos et al. | |
| 7,125,537 B2 * | 10/2006 | Liao et al. | 423/592.1 |
| 7,175,786 B2 * | 2/2007 | Celikkaya et al. | 264/5 |
| 7,182,929 B1 | 2/2007 | Singhal et al. | |
| 7,220,398 B2 | 5/2007 | Sutorik et al. | |
| 7,374,704 B2 * | 5/2008 | Che et al. | 264/13 |
| 7,629,553 B2 | 12/2009 | Fanson et al. | |
| 7,700,152 B2 | 4/2010 | Laine et al. | |
| 7,931,836 B2 * | 4/2011 | Xie et al. | 264/15 |
| 8,211,388 B2 | 7/2012 | Woodfield et al. | |
| 8,268,230 B2 | 9/2012 | Cherepy et al. | |
| 8,329,090 B2 | 12/2012 | Hollingsworth et al. | |
| 2002/0112794 A1 | 8/2002 | Sethuram et al. | |

(Continued)

OTHER PUBLICATIONS

Boulos, M. I., "The inductively coupled radio frequency plasma." Journal of High Temperature Material Process, 1997, vol. 1, pp. 17-39.

(Continued)

*Primary Examiner* — Mary F Theisen
(74) *Attorney, Agent, or Firm* — McCarter & English, LLP; Deborah M. Vernon (57) ABSTRACT

A method for processing feed material to produce dense and spheroidal products is described. The feed material is comprised of powder particles from the spray-drying technique or solution precursor droplets from ceramic or metallic materials. The feed material is processed using plasma generated from a microwave. The microwave plasma torch employed is capable of generating laminar flow during processing which allows for the production of spheroidal particles with a homogenous materials distribution. This results in products having improved thermal properties, improved corrosion and wear resistance and a higher tolerance to interface stresses.

11 Claims, 8 Drawing Sheets

(56) References Cited

U.S. PATENT DOCUMENTS

| | | | |
|---|---|---|---|
| 2004/0009118 A1* | 1/2004 | Phillips et al. | 423/592.1 |
| 2004/0045807 A1 | 3/2004 | Sarkas et al. | |
| 2004/0183008 A1 | 9/2004 | Wiseman | |
| 2005/0025698 A1 | 2/2005 | Talbot et al. | |
| 2005/0163696 A1* | 7/2005 | Uhm et al. | 423/445 B |
| 2005/0242070 A1* | 11/2005 | Hammer | 219/121.48 |
| 2006/0145124 A1 | 7/2006 | Hsiao et al. | |
| 2007/0075052 A1 | 4/2007 | Fanson et al. | |
| 2007/0130656 A1* | 6/2007 | Boulos et al. | 977/840 |
| 2007/0259768 A1* | 11/2007 | Kear et al. | 501/120 |
| 2008/0006954 A1* | 1/2008 | Yubuta et al. | 264/5 |
| 2008/0173641 A1* | 7/2008 | Hadidi et al. | 219/690 |
| 2009/0074655 A1 | 3/2009 | Suciu | |
| 2009/0093553 A1* | 4/2009 | Kleine Jager et al. | 516/33 |
| 2010/0176524 A1* | 7/2010 | Burgess et al. | 264/12 |
| 2012/0294919 A1 | 11/2012 | Jaynes et al. | |
| 2012/0322645 A1 | 12/2012 | Jordan et al. | |
| 2013/0270261 A1* | 10/2013 | Hadidi et al. | 219/686 |
| 2014/0155249 A1 | 6/2014 | Hadidi et al. | |
| 2014/0217630 A1 | 8/2014 | Redjdal et al. | |

OTHER PUBLICATIONS

Laine, R. M. et al., "Making nanosized oxide powders from precursors by flame spray pyrolysis." Key Engineering Materials (1999), v 159-160, p. 17-24.

Muoto, C. et al., "Phase Homogeneity in Y2O3-MgO Nanocomposites Synthesized by Thermal Decomposition of Nitrate Precursors with Ammonium Acetate Additions" J. Am. Ceram. Soc., 94[12] 4207-4217.

Veith et al., "Low temperature synthesis of nanocrystalline Y3Al5O12 (YAG) and Ce doped Y3Al5O12 via different sol-gel methods." J. Mater Chem, (1999) 9: 3069-3079.

* cited by examiner

METHOD FOR THE DENSIFICATION AND SPHEROIDIZATION OF SOLID AND SOLUTION PRECURSOR DROPLETS OF MATERIALS USING MICROWAVE GENERATED PLASMA PROCESSING

TECHNICAL FIELD

The present invention is generally directed to a method for taking feed material and processing the feed material to produce dense and spheroidal products. The feed material is comprised of powder particles from the spray-drying technique or solution precursor droplets containing ceramic or metallic materials. More particularly, the present invention is directed to a method which uses a microwave plasma torch capable of generating a laminar flow pattern during materials processing to produce dense and spheroidal products. The laminar flow in an axisymmetric hot zone with a uniform temperature profile within the torch allows for the production of uniform spheroidal particles with a homogenous materials distribution, which leads to final products possessing superior characteristics.

BACKGROUND OF THE INVENTION

One of the most important aspects of preparing industrial powders is the spheroidization process, which transforms powders produced by spray drying and sintering techniques, or angular powders produced by conventional crushing methods, into spheres. Spheroidized particles are more homogenous in shape, denser, much less porous, provide higher flowability, and possess lower friability. These characteristics make for powders that are superior for applications such as injection molding, thermal spraying of coatings and provide parts having near net shapes.

Current spheroidization methods employ thermal arc plasma described in U.S. Pat. No. 4,076,640 issued Feb. 28, 1978 and radio-frequency generated plasma described in U.S. Pat. No. 6,919,527 issued Jul. 19, 2005. However, these two methods present limitations which result from the characteristics of the radio-frequency plasma and the thermal arc plasma.

In the case of thermal arc plasma, an electric arc is produced between two electrodes and is then blown out of the plasma channel using plasma gas. Powder is then injected from the side, perpendicular or at an angle, into the plasma plume, where it gets exposed to the high temperature of the plasma and is collected as spheres in filters during subsequent processing. An issue with thermal arc plasma is that the high temperature of the electrodes leads to erosion of the electrodes, which leads to contamination of the plasma plume with the electrode material, resulting in the contamination of the powders to be processed. In addition, the thermal arc plasma plume has an inherently uneven temperature gradient, and by injecting powder into the plasma plume from the side, the powder gets exposed to an uneven temperature gradient that leads to the production of particles that are not homogenous in size, density or porosity.

In the case of radio frequency plasma spheroidization, the plasma is produced in a dielectric cylinder by induction at atmospheric pressure. Radio frequency plasmas are known to have low coupling efficiency of the radio frequency energy into the plasma and a lower plasma temperature compared to arc and microwave generated plasmas. The magnetic field responsible for generating the plasma in radio-frequency plasma is non-uniform in profile which leads to an uneven temperature gradient and thus a non-homogenous thermal treatment of the particles. This leads to non-homogeneity in size, microstructure, and density or porosity of the final product.

Thus there is a need to provide a homogenous and uniform high temperature thermal path for all the feed materials processed which results in high purity, contamination-free, and homogenous spherical particles. However, no such method has been reported.

From the above, it is therefore seen that there exists a need in the art to overcome the deficiencies and limitations described herein and above.

SUMMARY OF THE INVENTION

The shortcomings of the prior art are overcome and additional advantages are provided through the use of a microwave generated plasma torch apparatus that is capable of producing laminar flow patterns to spheroidize and densify geometrically non-uniform powder particles and solution precursor droplets of ceramic materials.

In accordance with one embodiment of the present invention a pressurized powder feeder is used to axially inject powder particles into a plasma chamber where the powder particles are entrained in a laminar gas flow pattern and undergo uniform heat treatment by being exposed to a uniform temperature profile within the microwave generated plasma. This results in spheroidal pearl-like particles having uniform density.

In another embodiment of the present invention, a droplet maker or atomizer is used to inject solution precursor droplets which are entrained in a laminar gas flow pattern and undergo uniform heat treatment by being exposed to a uniform temperature profile within the microwave generated plasma to produce spheroidal pearl-like particles having uniform density.

Another feature of this invention is that it uses microwave generated plasma in accordance with U.S. patent application Ser. No. 13/445,947.

Therefore, an object of the present invention is to provide a laminar flow environment, free of turbulent flow effects, for the feed material that is processed with the microwave generated plasma, which results in dense and spheroidal particles having uniform sizes and shapes and characterized by a homogenous materials distribution.

It is another object of the present invention to enhance plasma processing of materials so as to provide a product with improved thermal properties, improved corrosion and wear resistance and a higher tolerance to interface stresses.

Additional features and advantages are realized through the techniques of the present invention. Other embodiments and aspects of the invention are described in detail herein and are considered a part of the claimed invention.

The recitation herein of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

DETAILED DESCRIPTION

Figure 1:
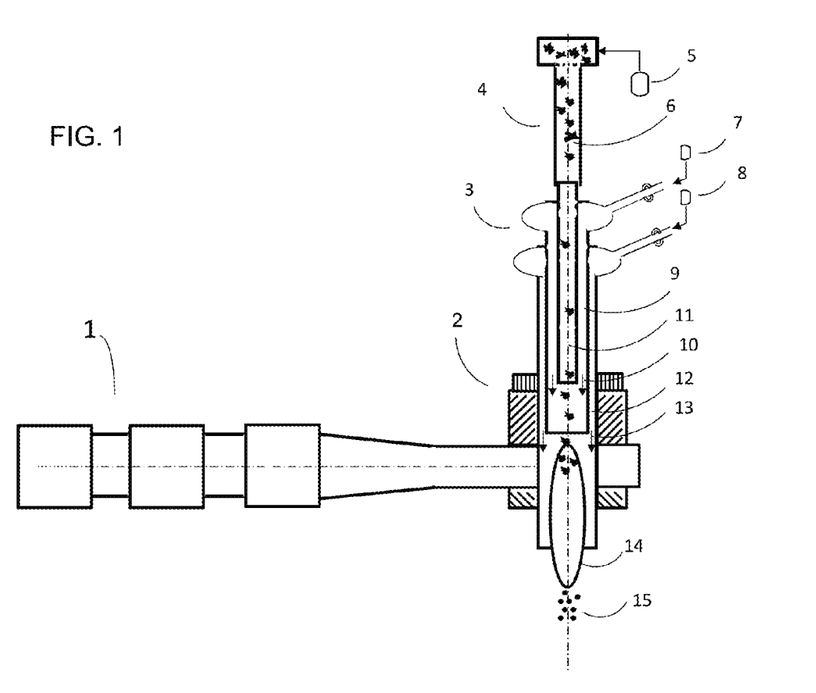
FIG. 1 illustrates a preferred embodiment of the apparatus used for making dense and spheroidized particles which uses the microwave generating source described in US Patent Application 2008/0173641 A1, a dielectric plasma torch as described in U.S. patent application Ser. No. 13/445,947, and a materials feeder such as a powder feeder, or solution precursor reservoir which dispenses powder particles, or solution droplets, in accordance with the present invention.

Referring to FIG. 1, an apparatus to produce dense and spheroidal products which includes a microwave radiation generator 1, a plasma chamber 2, a dielectric sheathing plasma torch 3, and a powder feeder, or solution precursor injector, 4. The microwave radiation generator 1, described in US Patent Application 2008/0173641 A1 is combined with plasma chamber 2 and plasma sheathing torch 3. Both 2 and 3 are described in U.S. patent application Ser. No. 13/445, 947. The particle feeder 4 is an injection apparatus with a pressurized source 5 that can feed solid powder particles 6 into dielectric plasma torch 3. When powder injection is used, particles 6 may be a product of spray-drying techniques or other techniques. Alternatively, particles 6 may be droplets of solution precursor injected using an atomizer, or a droplet maker energized with a high frequency electrical drive. Pressurized sources 7 and 8 are used to introduce process gases as inputs into 3 to entrain and accelerate particles 6 along axis 11 towards plasma 14. First, particles 6 are accelerated by entrainment using core laminar gas flow 10 created through annular gap 9. Cooling laminar flow 13 created through annular gap 12, flows at not lower than 100 standard cubic feet per hour in the case of solid powder feed or atomized injection, and provides laminar sheathing for the inside wall of dielectric torch 3 to protect it from melting due to heat radiation from plasma 14. High flow is also needed to keep particles 6 from reaching the inner wall of 3 where plasma attachment could take place. Relatively lower gas flows are needed when using a droplet maker injector as the flow of particles is more uniform and follows axis 11 closely. Particles 6 are guided by laminar flows 10 and 13 towards microwave plasma 14 were they undergo homogeneous thermal treatment to become dense and spherical product particles 15. The densification and spheroidization of spray-dried ceramic solid particles 6, or of droplets of solution precursor materials, is achieved by choosing the appropriate experimental parameters capable of maintaining a stable microwave generated plasma 14 to produce dense and spherical particles 15. These parameters are microwave power in 1, powder particles or solution precursor droplet injection flow rates along axis 11, carrier gas flow rates of laminar entrainment flow 10, laminar cooling flow 13 inside the dielectric sheathing torch 3, heating rates within plasma 15 and quenching rates not less than $10^{3}$° C./sec upon exit of plasma 15.

Figure 2A:
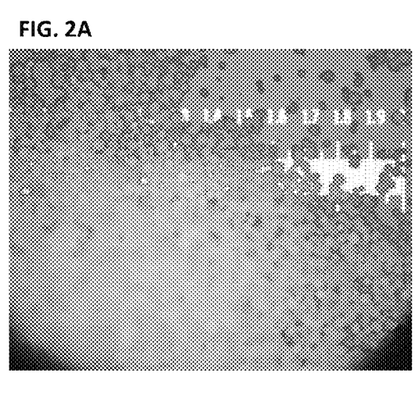
FIG. 2a illustrates densified and spheroidized MgO—$Y_2O_3$ particles obtained by the microwave plasma process after injection of spray-dried powder.
Figure 2B:
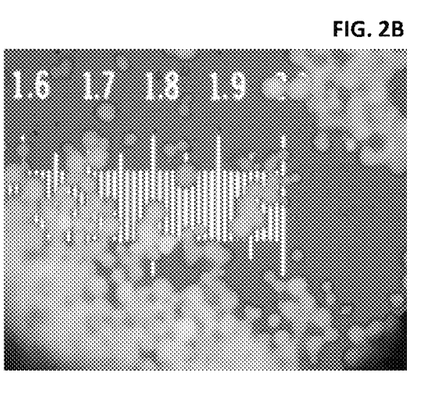
FIG. 2b illustrates the size of the densified and spheroidized MgO—$Y_2O_3$ particles obtained by the microwave plasma process after injection of spray-dried powder by reference to the scales on a ruler.

Referring to FIG. 2, this method has been applied to spheroidize particles 6 made of commercial Magnesia-Yttria (MgO—$Y_2O_3$) solid powder particles obtained by the spray-drying technique of the INFRAMAT Corporation. Particles 6, in the case of INFRAMAT powder, possess closed or semi-spherical morphology, low density, and are highly porous and brittle particles. The powder feeder 4, with a reservoir with low pressure gas flow (<20 PSI) from pressurized source 5, provides a fluidized bed for particles 6 which are driven by gas flow through powder feeder 4 towards the input of plasma torch 3. Particles 6 diameters initially ranged between 38 micrometers (μm) and 73 μm. The elimination of small particles prior to injection (particles with diameters less than 37 μm) reduces any recirculation of materials above the hot zone. The elimination of large particles (larger than 75 μm) reduces the diameter range of particle products that will be collected. Sieves with mesh size 400 (38 μm), and 200 (74 μm) have been used to accomplish this classification. Particles 6 are then entrained and accelerated along axis 11 by laminar gas flow 10 for a minimum distance of two (2) inches towards microwave plasma 14. Laminar flow 10 is crucial in constraining the flow paths of particles 6 to a cylindrical region as close as possible to axis 11. The penetration into plasma 14 is accomplished in such a manner that directional paths of particles 6 take place at the center of plasma 14 along axis 11. Particles 6 are again accelerated, in part, by a second laminar gas flow 13, over a minimum distance of three quarters of an inch before reaching the top of the plasma flame 14. The primary function of laminar flow 13 is to ensure adequate cooling of the dielectric tube sheath 3 that houses the plasma. Laminar flow 13 need to be high enough to span the remainder of the length of the outer tube of dielectric plasma torch 3. The processing medium that combines the axis-symmetric laminar gas flows 10 and 13, along with the uniform temperature profile of plasma 14, ensures that thermal processing of particles 6 is done volumetrically to yield the dense spherical products 15 shown in FIG. 2a. Two large ticks of the ruler in FIG. 2b correspond to 100 micrometers which demonstrates that particles 15 range in diameter from 15 micrometers to 50 micrometers. The densified and spheroidized particles 6 exhibit a "pearl" like texture and morphology.

Figure 3:
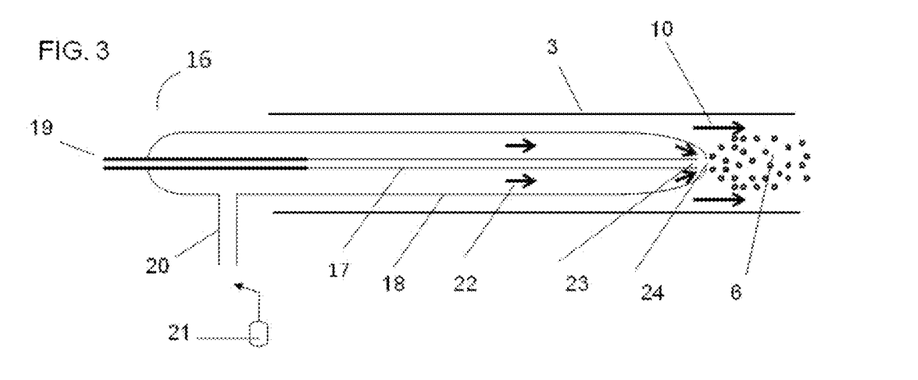
FIG. 3 illustrates a method of atomizing droplets using a nebulizing apparatus.

Referring to FIG. 3, particles 6 are produced using a nebulizing apparatus 16 for solution precursor injection. Nebulizer 16 consists of two concentric quartz tubes 17 and 18 which are fused together. A solution precursor of 7YSZ, or any other weight concentration of Yttrium ranging from 3% to 20%, in a pressurized stainless steel tank is introduced at input 19 of tube 17. The solution precursor injection flow rate is in the order of 4 milliliters per minute and the gas tank pressure is about 20 pounds per square inch (PSI). The length of tube 18 is no smaller than 2 inches and does not exceed one foot. Through input tube 20, a pressurized gas source 21 pushes the atomizing gas flow 22 through an annular gap between concentric tubes 18 and 17 in nebulizer 16. The injected solution precursor exits through orifice 23 where it is atomized by gas flow 22, and exits at orifice 24 of tube 18 as an aerosol of droplet particles 6. The distance between orifice 23 and orifice 24 must not exceed 1 millimeter (mm). The end of tube 18 is tapered so that gas flow 22 enters the jet of solution precursor with an angle close to 90 degrees. Upon exit, particles 6 are entrained by laminar flow 10 in dielectric plasma torch 3, also seen in FIG. 1, and subsequently the particles reach the axis-symmetric thermal processing medium inside dielectric plasma torch 3 where they undergo volumetric heating in plasma 14.

Referring to FIG. 4 and FIG. 5, these illustrate densified and spheroidized 7YSZ product particles 15 by atomizing 7YSZ solution precursor using nebulizer 16. Particles 15 exhibit a “pearl” like texture and morphology. Particles 15 measure approximately between 20 micrometers (μm) and 53 micrometers (μm) in diameter as shown in FIGS. 4 (20 to 38 μm), and FIGS. 5 (38 to 53 μm) after post-classification with sieves having mesh sizes of 635 (20 μm), 400 (38 μm), and 270 (53 μm), respectively.

Referring to FIG. 6, the densified and spheroidized particles are made according to the procedure described therein. The powder particles to be processed are first sifted and classified according to their diameters, the minimum diameter is 20 μm and the maximum diameter is 74 μm. This eliminates recirculation of light particles above the hot zone of the plasma chamber and also ensures that the process energy present in the plasma is sufficient to melt the particles. This powder is then disposed in a powder feeder where a fluidized bed, in an internal chamber using a relatively low pressurized source of air not exceeding 20 pounds per square per inch (PSI), is introduced. For a better flow of the powder, the powder feeder is constantly shaken using a shaker energized by another pressurized source of air having a minimum pressure of 20 pounds per square per inch (PSI). The powder is carried from inside the powder feeder towards the input of the feeding tube of the dielectric plasma torch under pressure which permits a constant injection of particles into the plasma process. Prior to this, and referring to the right side of FIG. 6, microwave radiation is introduced into the waveguide towards the plasma chamber where the dielectric plasma torch is located, and placed perpendicularly to the waveguide. Two annular flows are introduced; one for entrainment of injected particles and the other flow protects the inner wall of the outer tube of the plasma torch from melting under the effect of the high heat from the plasma. Once both flows are in place, the plasma is ignited inside the dielectric plasma torch. An appropriate combination of entrainment and cooling flows are chosen to stabilize the plasma. In addition, these entrainment and cooling flows are chosen to allow smooth circulation of particles towards the plasma and avoid turbulence that could create recirculation and back flow of powders above the hot zone of the chamber. In addition these entrainment and cooling flows are chosen to minimize any non-uniformity in the thermal path in the outward radial direction away from axis 11. Once the particles reach the plasma now present in the hot zone, they are subjected to a uniform melt state characterized by a uniform thermal path for particles along with a uniform temperature profile of the plasma in the hot zone. The particles are processed volumetrically and uniformly and exit into an atmospheric fast quenching chamber below the exit nozzle of the plasma. The product upon solidification is collected in nylon or stainless steel filters, or quenched in distilled water in some applications, and analyzed for its microstructure and its mechanical, optical, and thermal properties.

Referring to FIG. 7, the figure illustrates a procedure to produce densified and spheroidized particles using solution droplets. The desired chemical composition is first mixed according to the assigned proportions of reactants. Subsequently it is thoroughly stirred to yield a homogenous molecular mix of reactants. The solution is then poured into a stainless steel tank. A pressurized source of air is used to inject air into the tank and push the solution towards an injector nozzle similar to a nebulizer, and injected into the central feeding tube of the nebulizer where it emerges as a jet. At the same time, another pressurized source is used to push air into an outer concentric tube of the nebulizer which penetrates the solution jet perpendicularly. Consequently this atomizes the jet into a mixture of droplets of different size diameters which are directed towards the plasma. Prior to this, referring to the right side of FIG. 7, the procedure to ignite the plasma is repeated as described in the paragraph referring to FIG. 6. Microwave radiation is introduced into the waveguide towards the plasma chamber where the dielectric plasma torch is located, and placed perpendicularly to the waveguide. Two annular flows are introduced; one for the entrainment of injected particles and the other flow to protect the inner wall of the outer tube of the plasma torch from melting under the effect of the high heat from the plasma. Once both flows are in place, the plasma is ignited inside the dielectric plasma torch. Adequate combination of entrainment and cooling flows are chosen to stabilize the plasma. Also, these flows are chosen so as to allow a smooth circulation of droplets towards the plasma and avoid turbulence that could create recirculation and back flow of powders above the hot zone of the plasma chamber, as well as avoiding a disruption in the thermal path. Once the droplets reach the plasma now present in the hot zone, they are subjected to a uniform melt state characterized by a uniform thermal path along with a uniform temperature profile of the plasma in the hot zone. The droplets are processed volumetrically and uniformly as solvent materials produced by oxidization and reduction reactions are burnt off. The processed particles exit into an atmospheric fast quenching chamber below the exit nozzle of the plasma. Upon solidification, the product is collected in filters, or in some applications quenched in distilled water, and analyzed for its microstructure and its mechanical, optical, and thermal properties.

Referring to FIG. 8, the figure illustrates a procedure to produce densified and spheroidized particles using uniform solution precursor droplets produced using a droplet maker. The desired solution’s chemical composition is prepared by first mixing the assigned proportions of reactants. Subsequently, the solution is thoroughly stirred to yield a homogenous molecular mix of reactants. The solution is then pumped inside the reservoir of a droplet maker by means of a peristaltic pump, or a pressurized tank. Once the reservoir is full, a piezo transducer is activated which impinges an adequate perturbation onto the liquid solution in the reservoir. Once the perturbation satisfies Rayleigh’s breakdown law, the solution emerges through a capillary nozzle as a continuous stream of uniform droplets exiting at a constant speed for a given drive frequency of the piezo. The nature of the droplets stream is monitored so that it is not in a burst mode or incidental mode but in the form of a jet with uniform droplets. This stream of droplets is then injected into the feeding tube of the dielectric plasma torch where it undergoes the same plasma process, and subsequently is transformed into a collection of dense and spheroidized particles as described in the paragraphs referring to FIG. 6 and FIG. 7.

EXAMPLES

Example 1

Spheroidization of MgO—Y$_2$O$_3$ Spray Dried Particles

Referring to FIG. 2, this method has been applied to spheroidize particles 6 made of commercial Magnesia-Yttria (MgO—Y$_2$O$_3$) solid powder particles obtained by the spray-drying technique from the Inframat Corporation. The densified and spheroidized particles 6 exhibit a "pearl" like texture and morphology.

Example 2

Spheroidization of Atomized 7YSZ Solution Precursor

Figure 4:
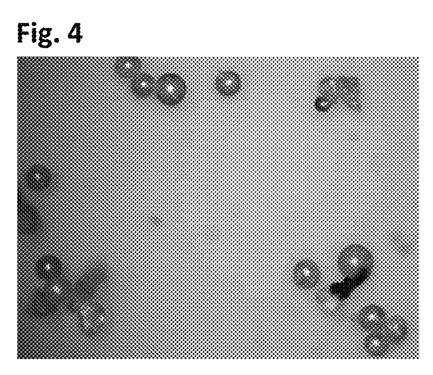
FIG. 4 illustrates densified and spheroidized 7% by weight $Y_2O_3$—$ZrO_2$ (7YSZ) ceramic particles, 20 to 38 micrometers in diameter after injection of 7YSZ precursor droplets using a nebulizing injector.
Figure 5:
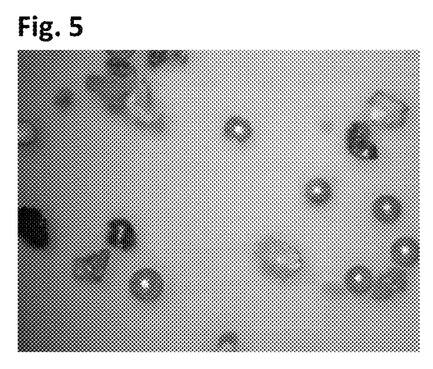
FIG. 5 illustrates densified and spheroidized 7YSZ ceramic particles, 38 to 53 micrometers in diameter after injection of 7YSZ precursor droplets using a nebulizing injector.
Figure 6:
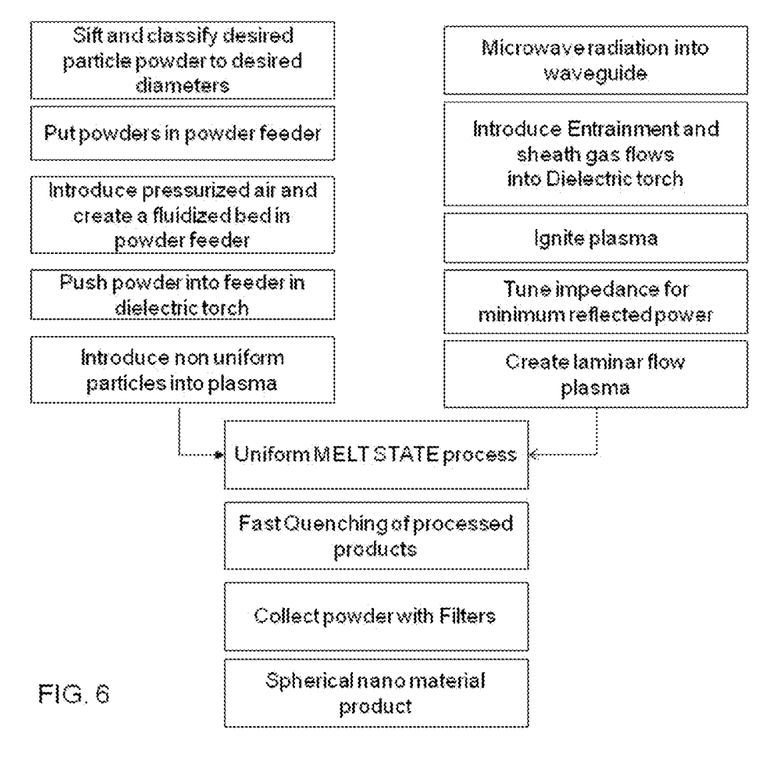
FIG. 6 illustrates a method of spheroidization by injection of solid powder using a powder feeder.
Figure 7:
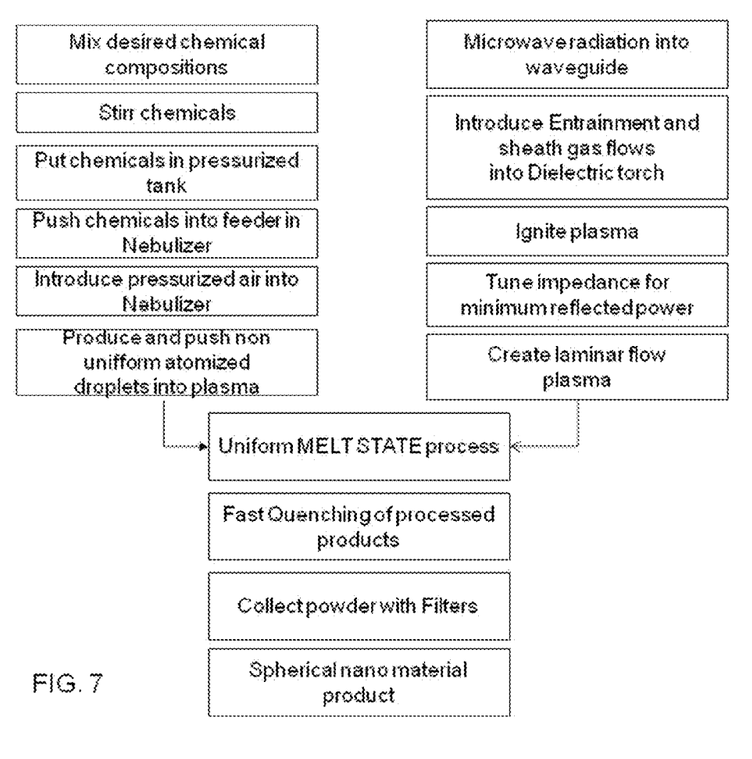
FIG. 7 illustrates a method of spheroidization by injection of a mist of droplets using a nebulizing nozzle.
Figure 8:
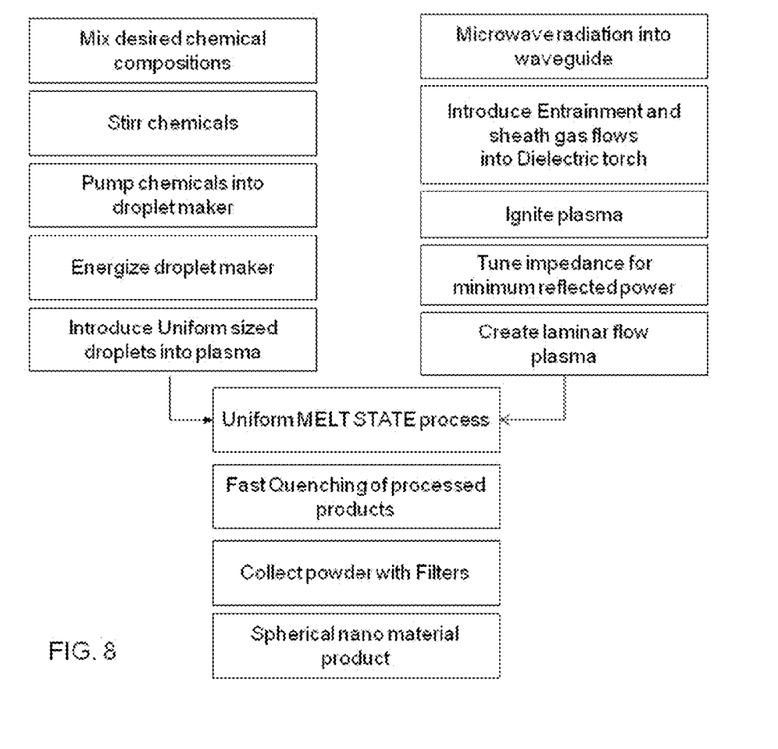
FIG. 8 illustrates a method of spheroidization by injection of a continuous stream of uniform droplets using a frequency driven droplet maker.

Referring to FIG. 4 and FIG. 5, this method has been applied to produce dense and spheroidized particles 6 directly from the injection of droplets of 7%-weight Yttria-Stabilized-Zirconia (7YSZ) solution precursor.

What is claimed is:

1. A method of producing spheroidal and dense powder products which comprises:
    introducing feed material through a materials feeder into a microwave plasma torch;
    entraining said feed material using an axis-symmetric laminar entrainment flow towards a microwave generated plasma;
    guiding said feed material towards the microwave generated plasma using an axis-symmetric laminar cooling flow;
    processing said feed material by exposing it to a uniform temperature profile within the microwave generated plasma;
    quenching plasma exhaust of said microwave generated plasma;
    filtering the exhaust gas of said microwave generated plasma; and
    extracting powder products from said filtered exhaust gas.

2. The method of claim 1 wherein said feed material is a powder with a substantially non-spherical shape.

3. The method of claim 1 wherein said feed material is a homogenous solution or a suspension of solution precursors injected as droplets.

4. The method of claim 1 wherein the microwave plasma torch is an axis-symmetric microwave plasma torch and said feed material is introduced along the central axis of said axis-symmetric microwave plasma torch.

5. The method of claim 1 wherein said materials feeder uses a fluidized bed.

6. The method of claim 1 wherein the materials feeder is a nebulizing atomizer which produces a mist of droplets having a diameter size ranging between 0.5 micrometers and 200 micrometers.

7. The method of claim 1 wherein the materials feeder is a droplet maker which uses a piezo electric transducer that injects uniform droplets to obtain uniformly dense and spherical products.

8. The method of claim 1 wherein the quenching step includes cooling the microwave plasma exhaust at quenching rates not less than $10^{3\circ}$ C./sec.

9. The method of claim 1 wherein the filtering step includes filtering the exhaust from the microwave plasma through bag filters and collecting spherical powder.

10. The method of claim 1 wherein the filtering step includes quenching into water.

11. The method of claim 1 wherein the powder product is densified to a range of 95% to 100%.

* * * * *